(12) United States Patent
Griner

(10) Patent No.: US 6,713,138 B2
(45) Date of Patent: Mar. 30, 2004

(54) COMBINATION FLUID COLLECTION CONTAINER AND DRIVE-UP SERVICE POINT IN A TRAFFIC LANE

(76) Inventor: Darrell P. Griner, 61 Mallery Ave., Elgin, IL (US) 60123

(*) Notice: Subject to any disclaimer, the term of this patent is extended or adjusted under 35 U.S.C. 154(b) by 0 days.

(21) Appl. No.: 09/859,198

(22) Filed: May 17, 2001

(65) Prior Publication Data

US 2002/0172785 A1 Nov. 21, 2002

(51) Int. Cl.[7] ............................. B32B 1/02; B32B 1/04; B60S 3/04
(52) U.S. Cl. ...................... 428/35.7; 428/34.1; 220/571; 220/573.1; 180/69.1; 296/38; 296/39.1; 184/106
(58) Field of Search ............................... 428/34.1, 35.7; 220/571, 573.1; 180/69.1; 296/38, 39.1; 184/106

(56) References Cited

U.S. PATENT DOCUMENTS

| | | | |
|---|---|---|---|
| 2,440,965 A | | 5/1948 | Merrill et al. |
| 2,996,150 A | | 8/1961 | Cassem |
| 3,872,820 A | * | 3/1975 | Hess .......................... 116/28 R |
| 4,183,834 A | * | 1/1980 | Evans et al. .................. 260/27 |
| 4,241,863 A | * | 12/1980 | Faller .......................... 229/27 |
| 4,246,982 A | * | 1/1981 | Pretnick .................... 184/106 |
| 4,497,147 A | | 2/1985 | Clapper et al. |
| 4,529,622 A | | 7/1985 | Maxfield |
| 4,671,024 A | | 6/1987 | Schumacher |
| 4,684,562 A | | 8/1987 | Hartkemeyer |
| 4,692,480 A | * | 9/1987 | Takahashi et al. ............ 523/218 |
| 5,080,956 A | | 1/1992 | Smith |
| 5,128,189 A | | 7/1992 | Bartlett |
| 5,308,670 A | | 5/1994 | Saylor |
| 5,464,492 A | | 11/1995 | Gregory et al. |
| 5,567,259 A | | 10/1996 | Gregory et al. |
| 5,626,933 A | | 5/1997 | Long |
| 5,834,104 A | | 11/1998 | Cordani |
| 5,861,206 A | | 1/1999 | Jensen |
| 5,888,604 A | | 3/1999 | Evans, Jr. et al. |
| 5,916,658 A | | 6/1999 | Mohr |
| 6,090,438 A | | 7/2000 | Dixon |
| 6,120,876 A | | 9/2000 | Walton |
| 6,165,591 A | | 12/2000 | Drauss |

* cited by examiner

*Primary Examiner*—Harold Pyon
*Assistant Examiner*—Marc Patterson
(74) *Attorney, Agent, or Firm*—Christopher J. Scott; Charles F. Meroni, JR.; Meroni & Meroni, P.C.

(57) ABSTRACT

A combination fluid collection container and drive-up service point in a traffic lane. The fluid collection container for retention of leaked automobile fluids is thermally bonded to the traffic lane surface adjacent to a drive up service point. The shallow, rectangular basin is formed of a thermoplastic material which is impervious to automotive fuels and lubricants, and resistant to wear and degradation by the environment. The container is formed of multiple thermoplastic components which are assembled during installation on the traffic lane surface. These components include a base sheet which provides the bottom surface of the container, side walls, and end walls. The outer edges of the end walls may be tapered during installation to remove any abrupt discontinuities in the traffic lane surface. The leaked fluids are retained within the container until removed in compliance with local laws and codes.

7 Claims, 5 Drawing Sheets

COMBINATION FLUID COLLECTION CONTAINER AND DRIVE-UP SERVICE POINT IN A TRAFFIC LANE

BACKGROUND OF THE INVENTION

Automobile drive up service points are provided by business and municipalities to make access to services more convenient for the driving public. Banking institutions have a long history of providing a drive up teller windows, and such service points have become very popular at other commercial venues such as fast food restaurants and pharmacies. Highway toll booths and automated banking machines, housed in kiosks, are additional examples of how drive up service points are well known in contemporary society.

Unfortunately, the automobiles which are used to access these drive up service points frequently leak or spill a variety of environmentally hazardous fluids at these locations during the brief time they are located there. These fluids include automobile fuel, lubricants, transmission fluids, and antifreeze, among others. These leaked or spilled fluids accumulate in the traffic lane at the drive up service points. Not only are these accumulations toxic to the environment, they present a safety hazard to pedestrian traffic and are unsightly. Additionally, these fluids have a deleterious effect on the traffic lane surface itself since they are known to attack the chemicals which bind asphalt together. When the surface integrity of asphalt is broken down in this way, rutting and pot holes begin to form and the pavement requires patching or replacement.

To protect themselves from injury liability, their property, and to maintain a pleasing appearance, owners of these facilities attempt to clean the traffic lane adjacent to the drive up service points by a variety of methods, including power washing the traffic lane surface and allowing the waste to flow into nearby storm sewers. These fluids can also migrate into water supplies as a result of storm runoff. However, these leaked or spilled automotive fluids are considered toxic wastes, and such disposals and runoffs are in violation of the Federal Clean Water Act, as well as various state and local laws.

A need exists to safely contain and store leaked or spilled automotive fluids which accumulate in the traffic lane adjacent to a drive up service point until the fluids can be safely and properly disposed of.

SUMMARY OF THE INVENTION

An innovative fluid collection container is provided which is thermally bonded to the surface of the traffic lane. The innovative container is a generally rectangular basin which is sized to be more narrow than an automobile's track, or distance between the centers of parallel wheels, allowing the automobile to pass over the container without contacting it. The fluid collection container is low in profile, and formed of a thermoplastic material which is impervious to automotive fuels and lubricants, resistant to wear, and resistant to degradation by sun, rain, and road salt. Glass beads are embedded within the thermoplastic material to provide a surface which is skid resistant, a safety feature important for pedestrian traffic.

The fluid collection container is installed on the surface of the traffic lane adjacent to the drive up service point at the location at which the vast majority of leaked or spilled automotive fluids accumulate. This location is spaced apart from the service point in the direction normal to the service point so that it resides below the longitudinal centerline of the automobile. This location is also spaced apart from the service point so as to lie ahead of the service point relative to the direction of traffic flow. This placement allows the fluid collection container to reside below the front end of the automobile, approximately between the front wheels of the automobile, when the driver is accessing the service point.

The innovative fluid collection container is formed of multiple thermoplastic components which are assembled during installation on the traffic lane surface. These components include a base sheet which provides the bottom surface of the container, side walls, and end walls. The leading and trailing edges of the end walls may be tapered during installation to remove any abrupt discontinuities in the traffic lane surface. When employed, this feature allows the traffic lane to be cleared by snow plows without damage to the fluid collection container. In areas of especially high traffic volume, the depth of the fluid collection container may be increased to provide additional fluid storage volume.

In traffic lanes where the innovative fluid collection container is fixed to the pavement surface, the leaked or spilled automobile fluids fall directly into the container while the automobile is stopped adjacent to a drive up service point. The fluids are retained within the container without leakage until safely and responsibly removed in compliance with local laws and codes, thus protecting the environment from needless automotive pollution. Use of the fluid collection container prevents degradation of the traffic lane surface by preventing destructive interaction between the leaked or spilled automotive fluids and asphalt, prolonging the functional life of the traffic lane surface. Further, when employed at new construction drive-up service points, use of the fluid collection container allows a choice of using the less expensive asphalt as the lane surface material rather than the more costly but more durable cement, since the innovative fluid collection container greatly increases integrity and useful life span of the asphalt.

Although drive up service points are designed for access by automobile traffic, it is not unknown for pedestrians to use these facilities. Additionally, drive up service points must be monitored and maintained by service personnel who approach them on foot. The innovative fluid collection container is provided with features which improve skid resistance and prevent the pedestrian from becoming soiled in the event that he/she steps into the fluid collection container as they approach a drive up service point.

A method of installing the fluid collection container on a traffic lane surface adjacent to a drive up service point is described.

DETAILED DESCRIPTION

Figure 1:
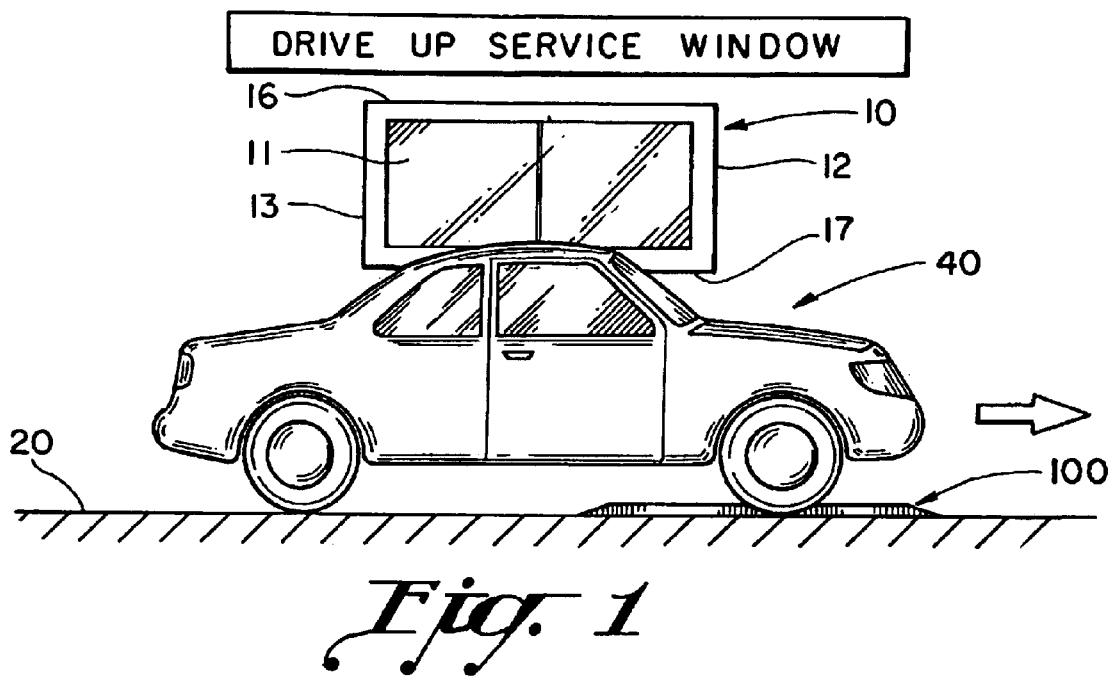
FIG. 1 is a side view of the fluid collection container installed on the traffic lane surface adjacent to a drive up service point, where the container is located on the pavement surface ahead of the service point, the arrow indicating direction of traffic flow.
Figure 2:
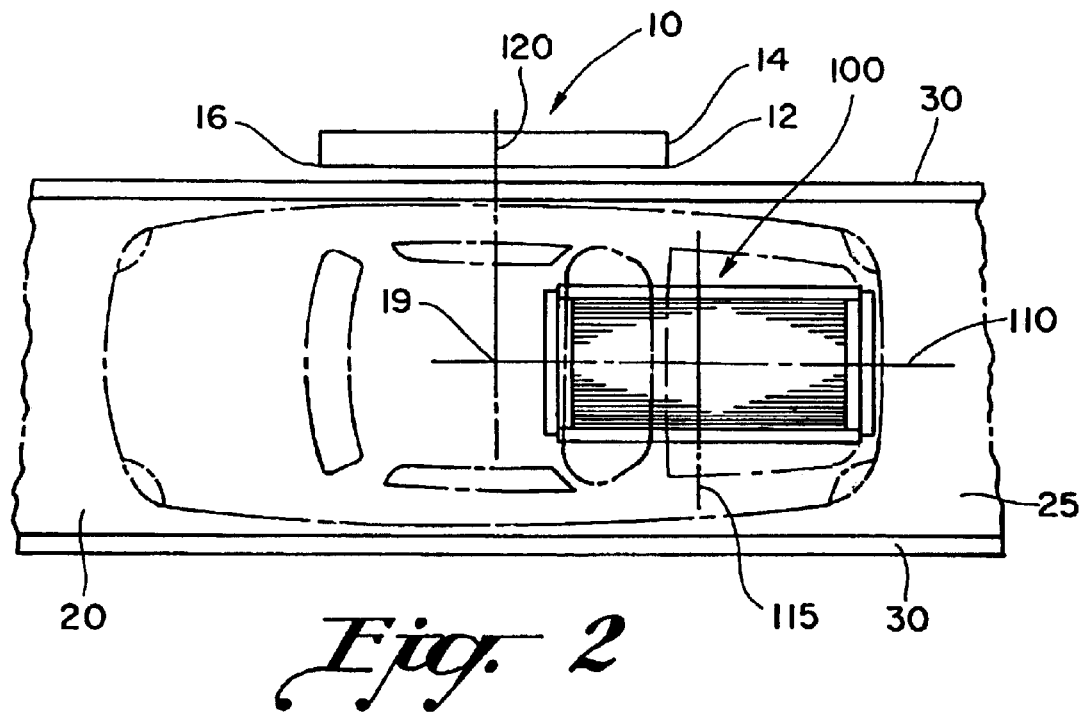
FIG. 2 is a top view of the traffic lane showing the fluid collection container installed adjacent to a drive up service point, where the longitudinal center line of the container is parallel to the traffic lane, where the transverse center line of the container is lies ahead of the service point, and the automobile (shown in phantom) is in a position to access the service point.
Figure 3:
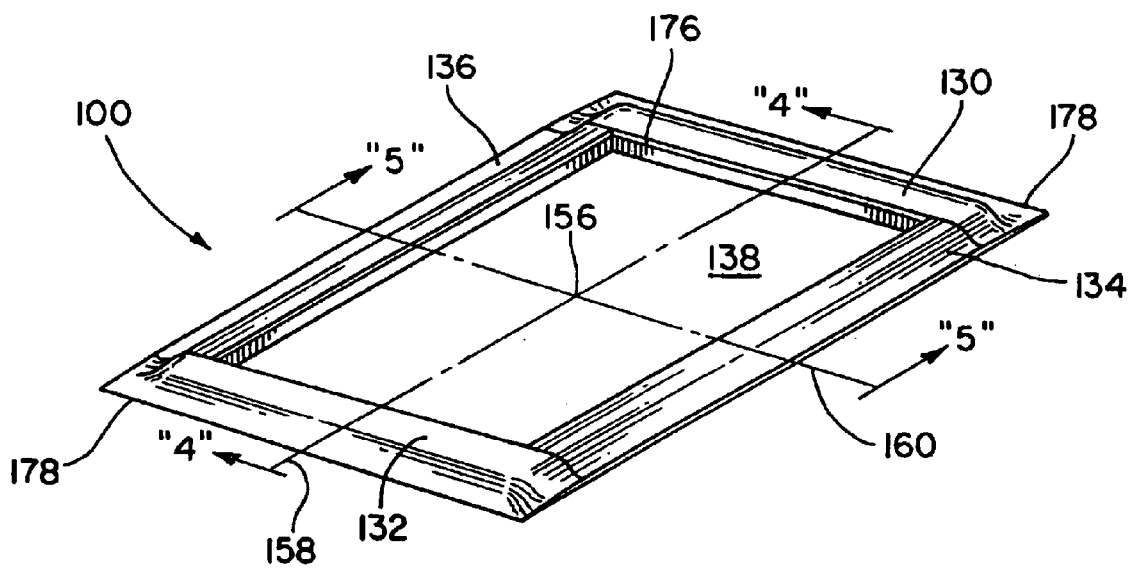
FIG. 3 is a perspective view of the fluid collection container, illustrating how the side walls and end walls over lap the base sheet, and illustrating the tapered outer edges of the end walls.
Figure 4:
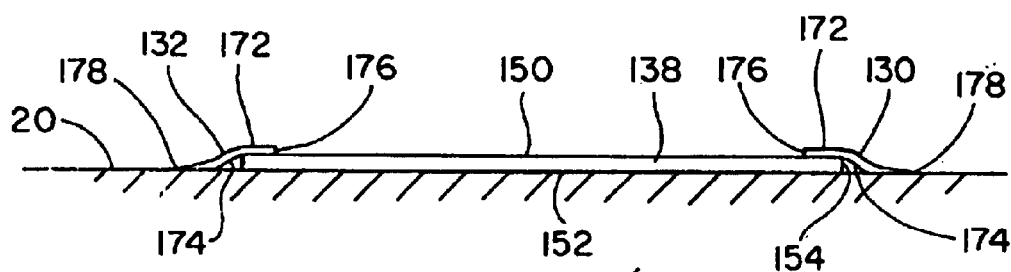
FIG. 4 is a sectional view of the fluid collection container across line 4—4 shown in FIG. 3, illustrating the overlapped relationship of the end walls to the periphery of the base sheet, and the tapered outer edges of the end walls.
Figure 5:
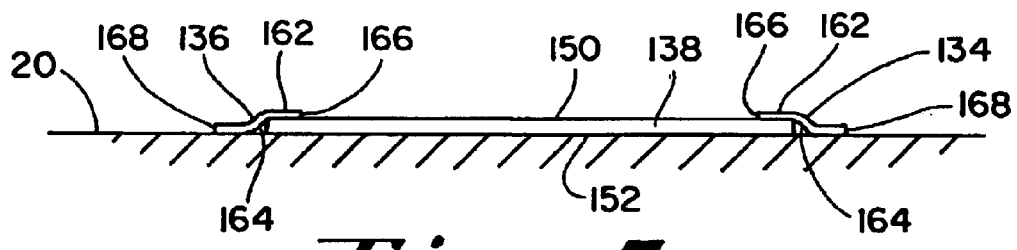
FIG. 5 is a sectional view of the fluid collection container across line 5—5 shown in FIG. 3, illustrating the overlapped relationship of the side walls to periphery of the base sheet.

The inventive fluid collection container will now be described in detail with reference to the figures. As shown in FIGS. 1 and 2, fluid collection container 100 is fixed to the pavement surface 20 of a traffic lane 25 which may or may not be bounded by one or more curbs 30. In the following description traffic lane surface 20 is formed of asphalt. However, it is well within the scope of this invention to employ fluid collection container 100 on surfaces formed of other materials, such as but not limited to cement.

Preferably rectangular in shape, container 100 is positioned relative to a drive up service point 10 as follows: The longitudinal centerline 110 of container 100 lies parallel to curb 30. Longitudinal centerline 110 is spaced apart from drive up service point 10 approximately 34 inches along a line which is normal 120 to drive up service point 10. Note that this spacing does not necessarily center container 100 over the centerline of traffic lane 25. The transverse centerline 115 of container 100 is spaced apart from drive up service point 10 such that it lies ahead of, or beyond, drive up service point 10 approximately 34 inches with respect to the direction of traffic flow. This location positions container 100 approximately between the front wheels of the automobile, and beneath the engine and transmission of the automobile, when the driver of the automobile is accessing drive up service point 10.

Drive-up service point 10 may preferably be defined as an access point for receiving goods or services along a traffic lane through a vehicular window. In other words when a vehicular driver brings a driven vehicle to a halt in order to enable the vehicular driver to more readily obtain goods or services from a drive-up window, automated teller machine, or similar other depot for enabling vehicular drivers to obtain good or services via a vehicular window (the access point), the drive-up window, automated teller machine, or similar other depot is located adjacent either the driver-side window of the vehicle or alternatively a passenger's window of the vehicle. The vehicular driver or a vehicular passenger may thus obtain the desired goods or services by extending an arm through the vehicular window to grasp goods or avail oneself of services. A generic drive-up service point 10 is generally illustrated in FIG. No. 1. Drive-up service point 10 preferably comprises a substantially vertical service point interface 11 as illustrated in FIG. Nos. 1 and 2. In this regard, it is noted that drive-up windows, automated teller machines. or similar other depots typically comprise a user interface with which the vehicular driver may interact to obtain goods or services. This interface or service point interface 11 typically comprises a substantially vertical window, touch pad, or other interactive means to enable the vehicular driver to more easily obtain the desired goods and services.

Service point interface 11 preferably comprises a fore service point edge 12 as illustrated in FIG. Nos. 1 and 2; a rear service point edge 13 as illustrated in FIG. Nos. 1 and 2; a superior service point edge 16 as illustrated in FIG. Nos. 1 and 2; and an inferior service point edge 17 as illustrated in FIG. No. 1. A vertically-oriented interface plane referenced at 120 lies intermediate fore service point edge 12 and rear service point edge 13 as illustrated in FIG. No. 2. It will be seen that interface plane 120 is preferably equidistant from fore service point edge 12 and rear service point edge 13 and thus necessarily is substantially vertically oriented. A spatial-locating plane 14 preferably extends through fore service point edge 12 as illustrated in FIG. No. 2. Spatial-locating plane 14 is referenced and described so as to enable the reader to more readily ascertain the preferred location or preferred positioned placement of fluid collection container 100 as will be discussed in more detail below.

Service point interface preferably further comprises a substantially planar exterior surface as is generally illustrated in FIG. No. 1 and as is typical of drive-up windows, automated teller machines, or similar other depots. It will be understood that interface plane 120 is perpendicular to the exterior surface at a service point center as is generally illustrated in FIG. No. 2. The service point center is equidistant from fore service point edge 12 and rear service point edge 13 and is essentially defined by the intersection of interface plane 120 with the planar exterior surface. It will be further understood from an inspection of FIG. No. 2 that spatial-locating plane 14 is preferably parallel with interface plane 120. For purposes of directing the reader to the preferred positioned placement of fluid collection container 100, interface plane 120 intersects longitudinal centerline 110 at a spatial-locating point 19 as referenced in FIG. No. 2.

It is thus contemplated that the present invention essentially comprises fluid collection container 100 for use in combination with drive up service point 10. Fluid collection container 100 and drive-up service point 10 thus comprise, in combination, a fluid collection container assembly or fluid collection container and a drive-up service point combination as preferably described hereinafter.

Fluid collection container assembly or fluid collection container 100 comprises at least five individual and separate components, which components are bonded together. The bonding process is described in more detail below. The components preferably comprise a rectangular, planar base sheet 138 as illustrated in FIG. Nos. 3–6; two rectangular, planar side walls as referenced at 134 and 136 in FIG. Nos. 3, 5, and 6; and two rectangular, planar end walls as referenced at 130 and 132 in FIG. Nos. 3 and 4. Base sheet 138, side walls 134 and 136, and end walls 130 and 132 preferably comprise or are constructed from a thermoplastic material, the thermoplastic material being impervious to vehicular or automotive fluids such as fuels, lubricants, and coolants.

Base sheet 138 preferably comprises a base sheet bottom surface 152 as illustrated in FIG. Nos. 4 and 5; a base sheet top surface 150 opposed to base sheet bottom surface 152 as illustrated in FIG. Nos. 4 and 5; a base sheet thickness intermediate base sheet top surface 150 and base sheet bottom surface 152; a base sheet peripheral edge 154 as illustrated in FIG. No. 4; a base sheet center 156 as illustrated in FIG. No. 3; a longitudinal axis as referenced at 158 in FIG. Nos. 3 and lies in the plane of base sheet 138 parallel to the length of the base sheet; and a transverse axis as referenced at 160 in FIG. No. 3 and lies in the plane of base sheet 138 parallel to the width of base sheet 138 and perpendicular to longitudinal axis 158. Longitudinal axis 158 of base sheet 138 coincides with the longitudinal midline of the base sheet and extends from a first end of base sheet 138 to a second end of base sheet 138. Transverse axis 160 of base sheet 138 coincides with the transverse midline of base sheet 138 and extends from a first side of base sheet 138 to a second side of base sheet 138.

Base sheet 138 preferably further comprises a geometric center, the geometric center defined by the orthogonal intersection of longitudinal axis 158 and transverse axis 160 as is generally illustrated in FIG. No. 2. It will be understood that longitudinal axis 158 preferably lies parallel to the traffic lane and thus the geometric center is preferably positioned adjacent the traffic lane surface at a base sheet center location. The base sheet center location is preferably spatially located approximately 34 inches from the exterior surface along interface plane 120 and approximately 54 inches from spatial-locating point 19 along longitudinal axis 158. Spatial-locating plane 14 is preferably intermediate transverse axis 160 and a rearward end wall of fluid collection container 100 as is illustrated in FIG. No. 2. In other words, given a right-handed Cartesian coordinate system in which the exterior surface lies in the X-Y plane (the X axis being the horizontal axis and the Y axis being the vertical axis) of the drawing page showing FIG. No. 1 and the origin of the coordinate system placed at the intersection of interface plane 120 and inferior service point edge 17, interface plane 120 extends in the Z-plane or out of the drawing page showing FIG. No. 1. The base sheet center location is then preferably located approximately 34 inches from the X-Y plane in the positive Z-direction along interface plane 120 and approximately 54 inches from spatial-locating point 19 in the positive X-direction along longitudinal axis 158. No specified number of Y-direction inches is provided from inferior service point edge 17 to longitudinal axis 158 as it is noted that the measured dimensions between inferior service point edge 17 and longitudinal axis 158 will differ depending on the drive-up service point scenario with which fluid collection container 100 is utilized. Similarly, it is further recognized that the measured dimension between superior service point edge 16 and inferior service point edge 17 may differ in any given drive-up service point scenario. However, if inferior service point edge 17 were 36 inches from the traffic lane surface, then the base sheet center location may be thought of as being preferably positioned at about (+54i, −35⅞j, +34k) inches from the cited origin, given a base sheet thickness of about ⅛ inch.

Side walls 134 and 136 each preferably comprise a side wall bottom surface 164 as illustrated in FIG. No. 5; a side wall top surface 162 opposed to side wall bottom surface 164 as illustrated in FIG. No. 5; a side wall thickness; a side wall inside edge 166 as illustrated in FIG. No. 5 and a side wall outside edge 168 as illustrated in FIG. No. 5. End walls 130 may preferably be defined as a fore end wall or an end wall coinciding with the forward direction of vehicular traffic relative to fluid collection container 100. End wall 132 may preferably be defined as a rear end wall or an end wall coinciding with the rearward direction of vehicular traffic relative to fluid collection container 100. End walls 130 and 132 each preferably comprise an end wall bottom surface 174 as illustrated in FIG. No. 4; an end wall top surface 172 opposed to end wall bottom surface 174 as illustrated in FIG. No. 4; an end wall thickness; an end wall inside edge 176 as illustrated in FIG. No. 4, and an end wall outside edge 178 as illustrated in FIG. No. 4. Base sheet 138, side walls 134 and 136, and end walls 130 and 132 are bonded together to form fluid collection container 100, which bonding procedure is described in more detail below.

Fluid collection container 100 is thus positioned in a preferred location as described atop a traffic lane surface adjacent the drive-up service point. In this regard, it is contemplated that fluid collection container 100 is designed to collect vehicular fluids, which emanate from a vehicle temporarily halted adjacent the drive-up service point, which vehicle is temporarily halted in superior relation to the fluid collection container.

"It will be further noted that container 100 is provided in an overall width which is narrower than an automobile's track, or distance between the centers of parallel wheels, allowing the wheels of the automobile to pass on either side of container 100 without contacting it. In the preferred embodiment, the overall width of container 100 is approximately 30 inches. However, it is well within the scope of the invention to provide a container having an overall width which is greater than 30 inches as long as it does not exceed the width of an automobile's track."

In the preferred embodiment, container 100 is provided in an overall length of approximately 42 inches. This length accommodates variations in automobile size and design. It is, however, well within the scope of the invention to provide a fluid collection container having a slightly smaller or greater length.

Container 100 is preferably formed of a thermoplastic which was developed for use in pavement markings. This highly durable material is composed of an ester modified rosin in conjunction with aggregates, pigments, binders, and glass beads, which is impervious to oil and gasoline, which is resistant to degradation by automotive fluids, the environment, and road salt, and which has a surface which is skid resistant. The material is commercially available under the name Premark 20/20 Flex, and is fully described in U.S. Pat. No. 5,861,206.

Referring now to FIGS. 3–6, container 100 is formed from a plurality of components, all formed from the thermoplastic material described above, which are assembled during installation on traffic lane surface 20. Application of heat via heat source 50, where heat source 50 consists of a propane torch or an equivalent localized, manually directable heat source, to the individual components per the method described below bonds the container to traffic lane surface 20, and bonds the individual components together, resulting in a unified, integrated, leak-proof fluid trap.

Figure 13:
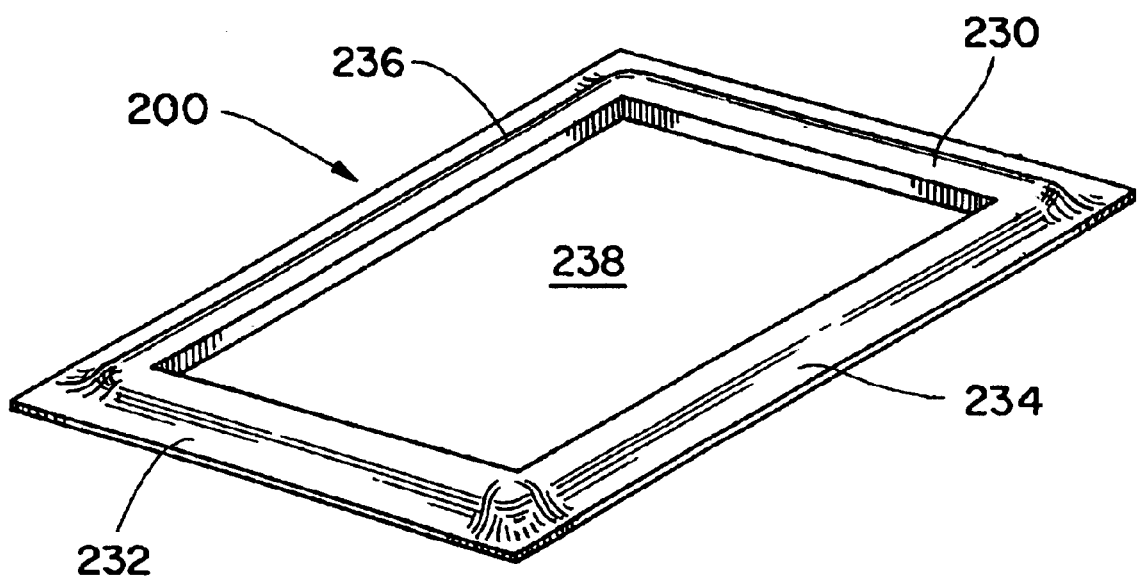
FIG. 13 is a perspective view of an alternative embodiment of the fluid collection contain illustrating the fluid collection container formed as a single, preformed piece.

It is, however, well within the scope of this invention to provide the inventive fluid collection container as a single, preformed unit 200 as shown in FIG. 13. This can be accomplished by pre-assembly, including thermally joining individual components, at an alternative location, or by molding container 200 as a single piece of thermoplastic material. If provided as a single, preformed unit, installation of container 200 would be simplified since on-site assembly would not be required.

In the preferred embodiment, container 100 is a shallow, rectangular basin, and consists of a rectangular base sheet, two side walls, and two end walls. However, it is within the scope of this invention to form container 100 in alternative shapes such as circular, oval, or polygonal. A rectangular container is preferred due to the ease of forming and assembling the individual components, but employment of alternative shapes may be considered to suit individual requirements, such as aesthetic considerations.

"Base sheet 138 is preferably formed of a rectangular sheet of thermoplastic material and comprises a bottom surface 152, a top surface 150 which is opposed to bottom surface 152 and separated from it by the thickness of base sheet 138, peripheral edge 154, and center 156. Base sheet 138 comprises a longitudinal axis 158 which lies in the plane of base sheet 138 on the longitudinal midline, lies parallel to its length, and coincides with longitudinal axis 110 of container 100, base sheet 138 further comprises transverse axis 160 which lies in the plane of base sheet 138 on its transverse midline, lies parallel to its width and perpendicular to longitudinal axis 158, and coincides with transverse axis 115 of container 100."

In the preferred embodiment, base sheet 138 has the approximate dimensions of 24 inches in width by 36 inches in length with a thickness of ⅛ inch. However, these dimensions can be varied to accommodate larger or smaller fluid collection containers. Size of the fluid collection container can be modified to accommodate locations having greater or smaller traffic volume, and desired frequency of waste removal.

Side walls 134, 136 are each formed of an elongate rectangular strip of thermoplastic material, each rectangular strip comprising a bottom surface 164, a top surface 162 which is opposed to side wall bottom surface 164 and separated from it by the thickness of the strip. Side walls 134, 136 are preferably rectangular in cross section, have an inside edge 166, and an outside edge 168 which is spaced apart from the inside edge by the width of the strip.

Side walls 134, 136 are provided in a length which is two inches less than the length of base sheet 138. Thus, in the preferred embodiment side walls 134, 136 have an approximate length of 34 inches. The approximate preferred width and depth are 4 inches and ⅛ inch, respectively.

End walls 130, 132 are each formed of an elongate rectangular strip of thermoplastic material, each rectangular strip comprising a bottom surface 174, a top surface 172 which is opposed to end wall bottom surface 174 and separated from it by the thickness of the strip. End walls 130, 132 are preferably rectangular in cross section, have an inside edge 176, and an outside edge 178 which is spaced apart from the inside edge by the width of the strip.

End walls 130, 132 are provided in a length which is six inches greater than the width of base sheet 138. Thus, in the preferred embodiment end walls 130, 132 have an approximate length of 30 inches. The approximate preferred width and depth are 4 inches and ⅛ inch, respectively.

Figure 12:
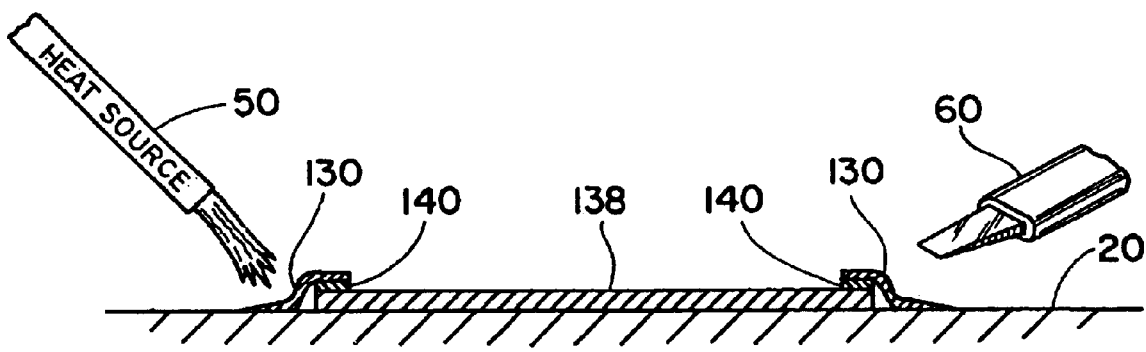
FIG. 12 is a side sectional view of the fluid collection container illustrating the method step of installing the end walls, wherein the outside edges of the end walls are tapered using a hand tool such as a putty knife so as to provide a smooth transition in elevation between the paved surface and the fluid collection container.

In colder climates, traffic lane surface 20 may be subjected to clearing of snow using snow plows. To prevent damage to container 100 by a snow plow blade, outside edges 178 of end walls 130, 132 may be provided with a downward taper, removing any stepwise discontinuity between the pavement and the fluid collection container, and allowing a plow blade to be smoothly lifted onto the top of container 100. This taper is formed on the outside edges 178 of end wall 130, 132 by flattening the outside edges 178 toward traffic lane surface 20 with a blunt tool such as a putty knife while the thermoplastic is heated and pliable (FIG. 12).

Figure 6:
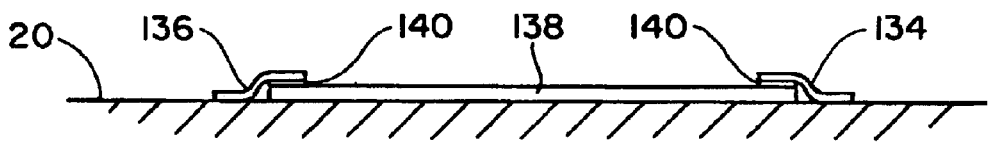
FIG. 6 is an alternative embodiment of the sectional view of the fluid collection container across line 5—5 shown in FIG. 3, illustrating the stacked relationship of the elongate rectangular riser strips, employed to give the container additional depth, to the base sheet and the side walls.

In areas of high traffic volume, or in cases where waste removal from container 100 is infrequent, it may be necessary to provide a fluid collection container having increased depth. Depth of container 100 may be increased from ⅛" to ¼ inch by insertion of elongate, narrow rectangular strips of thermoplastic material between base sheet 138 and each of the respective side walls 134, 136 and end wall 130, 132 (FIG. 6). In the preferred embodiment, these risers 140 are provided having a 1 inch width and ⅛ inch thickness, and have lengths which correspond to the respective lengths of the peripheral edges of base sheet 138. Risers 140 are placed along the peripheral edges 154 of base sheet 138 so that the outer edges of risers 140 are vertically aligned with peripheral edge 154. However, it is within the scope of the invention to increase the width of risers 140 so that the inner edges of risers 140 overlie the periphery of base sheet 138 and the outer edges of risers 140 extend beyond peripheral edge 154 of base sheet 138.

Although drive up service points 10 are designed for access by automobile traffic, it is not unknown for pedestrians to use these facilities. Additionally, drive up service points 10 must be monitored and maintained by service persons who approach them on foot. Container 100 is provided with features which improve skid resistance and prevent the pedestrian from becoming soiled in the event that he/she steps into container 100 as they approach a drive up service point 10.

The first such feature is skid resistance. The thermoplastic material used to form container 100 is embedded with glass beads so as to provide skid resistance. Material specifications require a minimum resistance value of 45 BPN when tested according to ASTM: E 303.

Figure 7:
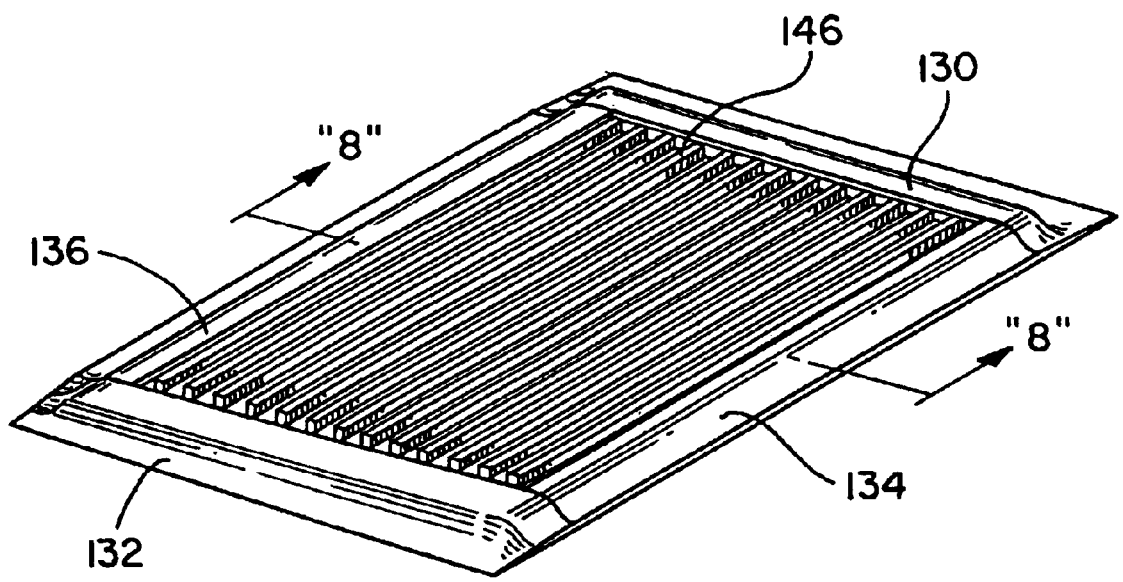
FIG. 7 is perspective view of an alternative embodiment of the fluid collection container wherein the interior portion of the container is provided with a baffled mat so as to allow pedestrian traffic to step on the fluid collection container without slippage or soiling their shoes.
Figure 8:
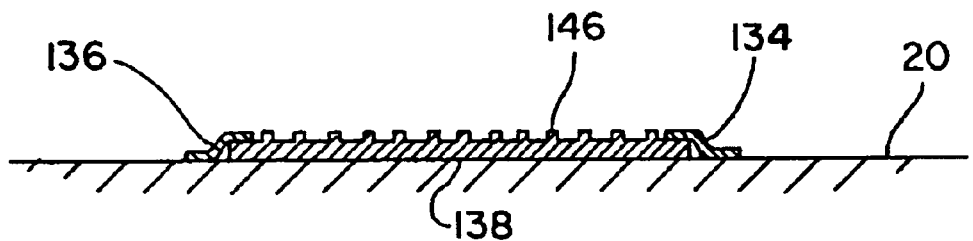
FIG. 8 is a sectional view of the fluid collection container across line 8—8 in FIG. 7, illustrating the relationship of the height of the mat to the height of the container, and showing how the baffling of the interior portion allows fluid to pool between the baffles.

The second such feature is a baffled mat 146 (FIG. 7) which may be provided with container 100. Mat 146 lies within the basin formed by side walls 134, 136 and end walls 130, 132, and overlies base sheet 138. Mat 146 is provided with the same thickness as side walls 134, 136 and end walls 130, 132 so that upper surface of mat 146 and the respective side and end walls form a level, planar surface for walking on, while the spaces between the baffles form a plurality of small "wells" which receive the leaked or spilled automotive fluids. Although only one baffle pattern is illustrated in the figures, it is understood that the baffles may be provided in a variety of patterns, including, but not limited to, longitudinal parallel baffles, transverse parallel baffles, concentric circular baffles, and intersecting diagonal baffles (diamond baffles). Mat 146 may be formed of thermoplastic material, or materials such as, but not limited to, metal. Alternatively, mat 146 may be formed of a sheet of thermoplastic material which has a pattern impressed upon it while softened by heating.

Fluid collection container 100, consisting of base sheet 138, side walls 134, 136, and end walls 130, 132, is assembled and bonded to traffic lane surface 20 as described in the following method steps:

1. Determine the location on the pavement where the fluid collection container is to be positioned. This location referred to as the application area, and is positioned relative to drive up service point 10 such that longitudinal centerline 110 of container 100 lies parallel to curb 30 and spaced apart from drive up service point 10 approximately 34 inches along a line which is normal 120 to drive up service point 10. Transverse centerline 115 of container 100 is spaced apart from drive up service point 10 such that it lies ahead of, or beyond, drive up service point 10 approximately 34 inches with respect to the direction of traffic flow. This location positions container 100 approximately between the front wheels of the automobile, and beneath the engine and transmission of the automobile, when the driver of the automobile is accessing drive up service point 10.

2. Clean and dry the application area. The application area is cleaned to remove all residues, including de-icing compounds such as salt, which could prevent proper adhesion of the oil and gas impervious base sheet to the pavement. Surface moisture is then removed from the application area by heating with a heat source such as a propane torch. This procedure prevents steam from forming between container 100 and traffic lane surface 20 as container 100 is thermally bonded to traffic lane surface 20 (step 4).

3. Position base sheet 138 in the application area so that the base sheet center overlies the center of the application area, and longitudinal axis 158 of base sheet 138 is parallel to the direction of traffic flow.

Figure 9:
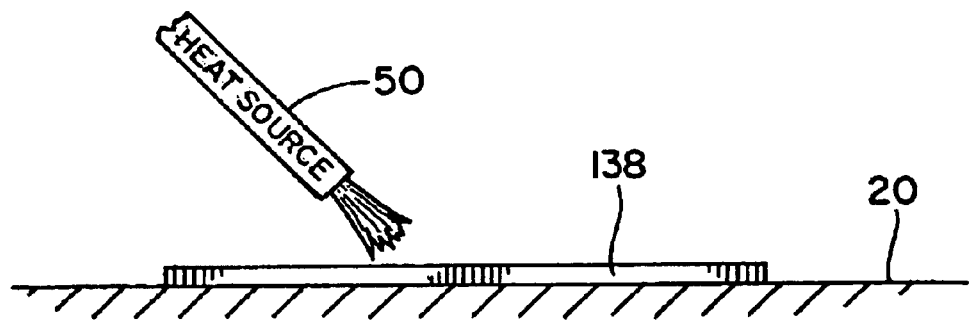
FIG. 9 is a side sectional view of the fluid collection container illustrating the method step of installing the base sheet wherein the base sheet is positioned and heat is applied to the base sheet using a heat source such as a propane torch.

4. Apply heat to base sheet 138 using heat source 50, such as a propane torch. Heat is applied until base sheet 138 is bonded to traffic lane surface 20 (FIG. 9).

5. Check bonding of base sheet 138 to traffic lane surface 20. This is achieved by attempting to lift container 100 off lane surface 20 by inserting a spatula-type tool between container 100 and lane surface 20 and visually checking the adhesion. After cooling, adhesion integrity is checked by striking base sheet 138 with a chisel. If bonding is imperfect, repeat step 4.

Figure 11:
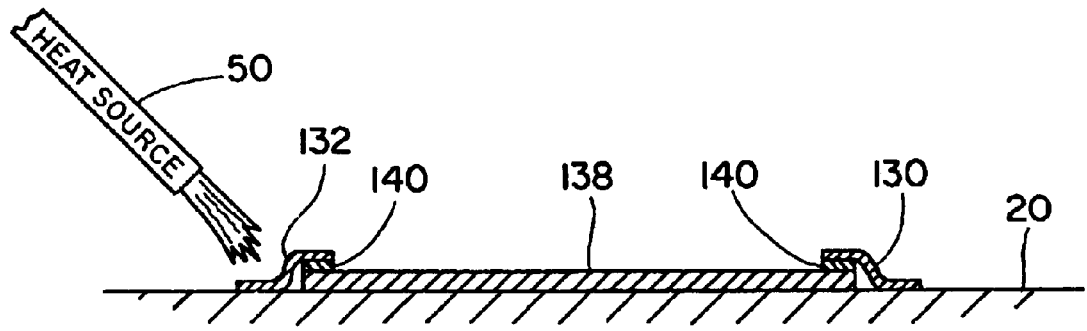
FIG. 11 is a side sectional view of the fluid collection container illustrating the method step of installing the end walls (or side walls), wherein the end walls (or side walls) are positioned so that its inside edge overlies the elongate rectangular riser strips and the peripheral edge of the base sheet, and its outside edge overlies the paved surface, and then heat is applied using a heat source such as a propane torch.

6. Position one of the side walls 134, 136 on each of the first and second sides of base sheet 138 such that the respective inside edges 166 of each side wall 134, 136 overlaps the peripheral side edge of base sheet 138, and the respective outside edges 168 of each side wall 134, 136 overlies traffic lane surface 20 adjacent to the peripheral edge of base sheet 138 (FIG. 11). Preferably, the respective inside edges 166 of each side wall 134, 136 overlaps the peripheral side edge of base sheet 138 approximately one inch, so that approximately three inches of the side wall overlies traffic lane surface 20.

7. Position one of the end walls 130, 132 on each of said first and second ends of base sheet 138 such that the respective inside edges 176 of each end wall 130, 132 overlaps the peripheral end edge of base sheet 138, and the respective outside edges 176 of end walls 130, 132 overlies traffic lane surface 20 adjacent to the peripheral edge of base sheet 138. Preferably, the respective inside edges 176 of each end wall 130, 132 overlaps the peripheral end edge of base sheet 138 approximately one inch, so that approximately three inches of the end wall overlies traffic lane surface 20.

8. Apply heat to side walls 134, 136 and end walls 130, 132 using heat source 50. Heat is applied until the respective inside edges 166, 176 of side walls 134, 136 and end walls 130, 132 are fused to base sheet 138 and each other to form an integrated, non-leaking, fluid impervious container, and until the respective outside edges 168, 178 of side walls 134, 136 and end walls 130, 132 are bonded to traffic lane surface 20.

9. Check bonding of side walls 134, 136 and end walls 130, 132 to base sheet 138 and to traffic lane surface 20. If bonding is imperfect, repeat step 8.

In colder climates, traffic lane surface 20 may be subjected to clearing of snow using snow plows. To prevent damage to container 100 by a snow plow blade, outside edges 178 of end walls 130, 132 may be provided with a downward taper. In these climates, an additional method step is added immediately following method step 8 as follows:

Method step 8a: Apply a downward pressure on the respective outside edges 178 of end walls 130, 132 while the thermoplastic material is hot and pliable so as to remove the upper corner of the outside edge (FIG. 12).

In areas of high traffic volume, or in cases where waste removal from container 100 is infrequent, it may be necessary to provide a fluid collection container having increased depth. When risers 140 are employed, the following two method steps are inserted after method step 5:

Method step 5a: Position the elongate narrow rectangular strips of thermoplastic material so as to overlie and confront the entire peripheral edge of the base sheet such that the outer edge of the elongate narrow rectangular strip is vertically aligned with the peripheral edge of the base sheet, and the inner edge of the elongate narrow rectangular strip overlies the body of the base sheet adjacent to the peripheral edge of the base sheet.

Figure 10:
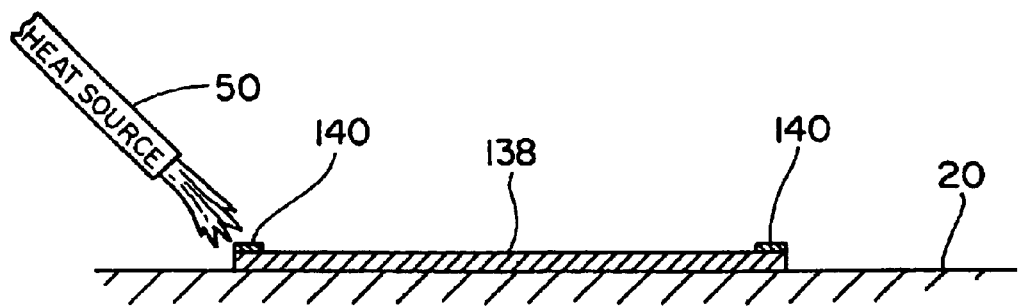
FIG. 10 is a side sectional view of the fluid collection container illustrating the method step of installing the elongate rectangular riser strips used to increase the depth of the container, wherein the elongate rectangular strips are positioned about the peripheral edge of the base sheet and then heat is applied using a heat source such as a propane torch.

Method step 5b: Apply heat to the elongate narrow rectangular strip using heat source 50. Heat is applied until the elongate narrow rectangular strip is bonded to and integral with base sheet 138 (FIG. 10).

In the above description of the method of installing fluid container 100 on traffic lane surface 20, it is understood that traffic lane surface 20 is formed of asphalt. However, it is well within the scope of this invention to employ fluid collection container 100 on surfaces formed of other materials, such as but not limited to cement. When installing fluid container 100 on cement, a surface sealer designed for sealing cement may be used to improve the adhesion of the thermoplastic material to the cement. Excellent results have been obtained when a commercially available sealant sold under the name "Pliobond" is used. The sealer acts to block moisture from coming up from the cement during the thermal bonding process, thus prevent steam formation between container 100 and traffic lane surface 20. When installing fluid container 100 on cement, the following method step is inserted after method step 2:

Method 2a: Apply a cement sealer to traffic lane surface 20 about the entire application area.

While changes may be made in the detail construction and implementation of method within the skill of those knowlegeable in the art, it shall be understood that such changes shall be within the spirit and scope of the present invention, as defined by the appended claims.

I claim,

1. A fluid collection container for use in combination with a drive-up service point, the fluid collection container and drive-up service point comprising, in combination:

a fluid collection container assembly, the fluid collection container assembly comprising at least five individual and separate components, the components being bonded together, the components comprising a rectangular, planar base sheet, two rectangular planar side walls, and two rectangular planar end walls, the base sheet, side walls, and end walls comprising a thermoplastic material, the thermoplastic material being impervious to vehicular fluids, the thermoplastic material comprising an ester modified resin and embedded glass beads, the base sheet comprising a base sheet bottom surface, a base sheet top surface opposed to the base sheet bottom surface, a base sheet thickness intermediate the base sheet top surface and the base sheet bottom surface, a base sheet peripheral edge, a base sheet center, a longitudinal axis lying in the plane of the base sheet parallel to the length of the base sheet, and a transverse axis lying in the plane of the base sheet parallel to the width of the base sheet and perpendicular to the longitudinal axis, the longitudinal axis of the base sheet coinciding with the longitudinal midline of the base sheet and extending from a first end of the base sheet to a second end of the base sheet, the transverse axis of the base sheet coinciding with the transverse midline of the base sheet and extending from a first side of the base sheet to a second side of the base sheet, the side walls each comprising a side wall bottom surface, a side wall top surface opposed to the side wall bottom surface, a side wall thickness, a side wall inside edge, and a side wall outside edge, the end walls comprising a fore end wall and a rear end wall, the end walls each comprising an end wall bottom surface, an end wall top surface opposed to the end wall bottom surface, an end wall thickness, and an end wall peripheral edge, the base sheet, the side walls, and the end walls being bonded together thus forming the fluid collection container; and a drive-up service point, the drive-up service point comprising a substantially vertical service point interface, the service point interface comprising a fore service point edge, a rear service point edge, a substantially planar exterior surface, and a service point center, the service point center being equidistant from the fore service point edge and the rear service point edge, the fluid collection container being positioned on a traffic lane surface adjacent the drive-up service point, the fluid collection container for collecting vehicular fluids, the vehicular fluids emanating from a vehicle, the vehicle being parked adjacent the drive-up service point in superior relation to the fluid collection container, the vehicle comprising a front track width and a rear track width.

2. The combination of claim 1 wherein the fluid collection container is bonded to the traffic lane surface.

3. The combination of claim 2 wherein the base sheet comprises a geometric center, the geometric center defined by an orthogonal intersection of the longitudinal axis and the transverse axis, the longitudinal axis lying parallel to the traffic lane, the geometric center positioned adjacent the traffic lane surface at a base sheet center location, the base sheet center location being spatially located approximately 34 inches from the exterior surface in the direction of the vehicle and approximately 54 inches from the service point center in the direction of the front track width.

4. The combination of claim 3 wherein the fluid collection container having an overall length of approximately 42 inches, an overall width of approximately 30 inches, and the base sheet thickness is approximately ⅛ inch.

5. A fluid collection container for use in vehicular fluid collection adjacent a drive-up service point, the fluid collection container comprising a thermoplastic material, the thermoplastic material comprising an ester modified resin and embedded glass beads, the fluid collection container being positioned on a traffic lane surface, the traffic lane surface being adjacent a drive-up service point, the drive-up service point comprising a substantially vertical service point interface, the fluid collection container for collecting vehicular fluids, the vehicular fluids emanating from a vehicle, the vehicle comprising an engine, a transmission, a front track width, and a rear track width, the vehicle being parked adjacent the drive-up service point, the engine and the transmission being in superior relation to the fluid collection container, the fluid collection container comprising a substantially planar rectangular bottom sheet, a substantially planar first side wall, a substantially planar second side wall, a substantially planar first end wall, and a substantially planar second end wall, the bottom sheet comprising an upper side, a lower side, a bottom sheet thickness, a bottom sheet length, a bottom sheet width, a peripheral edge, a geometric center, a longitudinal axis, and a transverse axis, the lower side being opposed to the upper side, the bottom sheet thickness being intermediate the upper side and lower side, the longitudinal axis lying in the plane of the bottom sheet parallel to the bottom sheet length, the transverse axis lying in the plane of the bottom sheet parallel to the bottom sheet width and perpendicular to the longitudinal axis, the lower side being bonded to the traffic lane surface, the first side wall and the second side wall each comprising side wall strips, the side wall strips each comprising a rectangular strip cross section, a side wall strip length, a side wall strip width, a side wall strip thickness, a side wall strip inside edge, and a side wall strip outside edge, the side wall strip lengths corresponding to the bottom sheet length, the side wall strip widths corresponding to the bottom sheet width, the side wall strip outside edges being separated from the side wall strip inside edges by the side wall strip thickness, the first end wall and the second end wall each comprising end wall strips, the end wall strips each comprising a trapezoidal cross section, an end wall length, an end wall width, an end wall thickness, an end wall inside edge, and an end wall outside edge, the end wall length corresponding to the bottom sheet width, the end wall outside edge being separated from the end wall inside edge by the end wall width, the first and second side walls being positioned about the bottom sheet, the side wall inside edges overlying portions of the bottom sheet peripheral edge corresponding to the bottom sheet length, the side wall outside edges extending outwardly, the first and second end walls being positioned about the bottom sheet, the end wall inside edges overlying portions of the bottom sheet peripheral edge corresponding to the bottom sheet width, the end wall outside edges extending outwardly, the side wall inside edges and the end wall inside edges being bonded to the bottom sheet to form the fluid collection container, the fluid collection container being impervious to vehicular fluids.

6. The fluid collection container of claim 5 wherein the fluid collection container has a container width, the container width having a measured dimension less than the front track width and the rear track width for enabling the vehicle to drive over the fluid collection container without contacting the fluid collection container.

7. The fluid collection container of claim 6 wherein the fluid collection container has a container length, the container length having a measured dimension of approximately 42 inches, the container width having a measured dimension of approximately 30 inches.

* * * * *